Patented Oct. 22, 1940

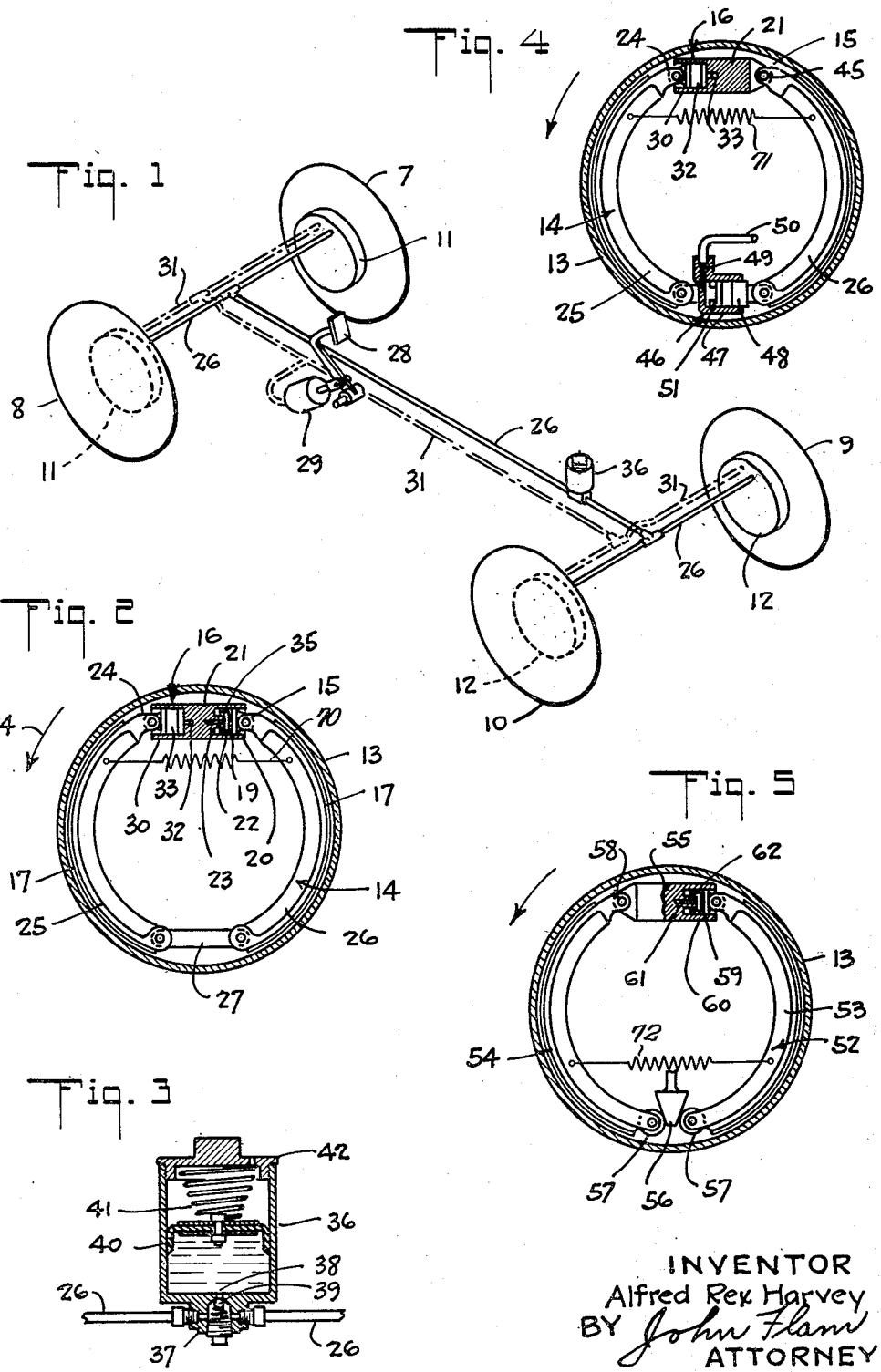

2,219,041

UNITED STATES PATENT OFFICE 2,219,041

BRAKE EQUALIZER

Alfred Rex Harvey, Los Angeles, Calif.

Application August 24, 1937, Serial No. 160,611

6 Claims. (Cl. 188—2)

This invention relates to braking systems, particularly for automotive vehicles.

Although this invention is of general utility in braking arrangements utilizing a plurality of brakes that are intended to be simultaneously applied, the embodiments of the invention herein described involve the use of the invention for automotive vehicles having two-wheel or four-wheel brakes. Such braking systems include a brake drum attached to each wheel, and a brake band carried by a brake shoe and associated with each drum and arranged to be urged into braking arrangement with it by suitable connections with a foot pedal or hand lever. In order to ensure against swerving during brake application, the braking effect obtained on corresponding pairs of wheels should be substantially the same, and further, the braking effect on different pairs of wheels should have a fixed ratio, which is most frequently unity.

To obtain the desired braking effect, it has been common to use a system of links and equalizing levers for connecting the brake pedal with the shoe mechanisms, to maintain the pressures exerted by the shoes at the correct proportions. Or the brake pedal may operate a plunger to exert pressure on a liquid which is effective to actuate each shoe by fluid pressure, as by Sylphon or cylinder and piston, the dimensions of which are chosen with due regard to the desired fluid pressures.

Either of the usual systems is quite satisfactory for causing the desired initial pressure at the bands, but that the desired braking effect will result does not necessarily follow. If the coefficient of friction between the drum and the band in one brake differs from that in another brake due to the presence of foreign matter, as water or oil, it is plain that equal pressures on the shoes will not give equal braking effects; and often one or more of the brake mechanisms may wear in a non-uniform manner so that even if all brakes are evenly applied, the resultant actual braking effects are non-uniform.

It is an object of this invention to make it possible to reduce materially any inequality in the braking effects caused by the several brakes.

One well-known type of brake is the so-called "self-energizing" type. In this form there are usually two brake shoes that are interconnected. One end of the interconnected series is usually arranged on an anchor pivot and the other end is subjected to a braking force. The frictional drag of the drum on both of the shoes creates resultant forces urging both shoes into engagement with the drum. The variations in braking effect due to differences in the engaging surfaces in this type of brake are greatly increased. For example, if one of the drums is slightly out of round, the frictional drag on certain portions of the brake drum may be so great as to lock the wheel. In any event, a dangerous tendency of the car to swerve is caused when the brakes are applied and uneven and accidental wear on the brakes is apt to occur.

It is therefore another object of this invention to make it possible materially to reduce any inequality in the braking effects of such "self-energizing" brakes.

These equalizing effects may be obtained by so arranging the applied braking elements that not only are the braking forces uniform for all of the brakes, but there is an assurance that forces existing from a point remote from the place where the braking forces occur, are also uniform. For example, this may be provided by the use of a hydraulic system joining points on the braking elements similarly spaced in each braking mechanism and joined together so that the fluid pressures are substantially equalized.

Accordingly it is still another object of this invention to provide a mechanism, whereby the forces exerted by all of a plurality of brakes at points remote from the force application are uniform.

This invention possesses many other advantages, and has other objects which may be made more easily apparent from a consideration of several embodiments of the invention. For this purpose there are shown a few forms in the drawing accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawing:

Figure 1 is a diagrammatic view showing the four wheels and brakes of an automotive vehicle, and incorporating the invention;

Fig. 2 is a section on an enlarged scale showing, in diagrammatic form, a brake incorporating one form of the equalizer;

Fig. 3 is a transverse section showing the means for maintaining the system full of liquid; and Figs. 4 and 5 are views similar to Fig. 2, showing modified forms of the invention.

In Fig. 1 a skeletonized diagram of a four-wheel braking system for an automobile is shown, the wheels 7, 8, 9 and 10 being represented diagrammatically as circles. Each of the front wheels 7, 8 has a brake mechanism 11; similarly, each rear wheel 9, 10 also has a brake mechanism 12.

In Fig. 2 a single brake drum and associated brake shoes are shown of the so-called "self-energizing" type, which may be incorporated for each of the brakes 11 or 12 of Fig. 1. In this form there is a brake drum 13 rigidly connected to its respective wheel and having an internal braking surface, although the external type of brake drum might also be utilized. Within the drum 13 is located the braking element 14. This braking element is supported, as is well understood, on a stationary part of the chassis structure.

The braking element 14 comprises two brake shoes 25 and 26, having a link connection 27. It is due to this link connection 27 that a braking force applied to the free extremity of brake shoe 25 may be effective to provide braking effects upon the brake shoe 14. Each of the brake shoes is provided with a brake lining 17 of appropriate composition.

The mechanism for applying the brakes is shown in this instance as a structure 16 in which fluid pressures are utilized to urge the upper free extremity 24 of brake shoe 25 toward the brake drum 13. For this purpose the extremity 24 is shown as pivotally connected to a packed piston 33 working in a cylinder 30. This cylinder 30 is formed as part of a stationary support 21. Fluid pressure is conducted into the cylinder chamber through a conduit 32 which is in communication with a conduit 31 (Fig. 1). This conduit 31 has branches extending to each of the cylinders 30 for each of the brake mechanisms 11 and 12. Fluid pressure can be applied in conduit 31 and therefore within the cylinders 30, by depressing a pedal 28 operating a piston in the cylinder 29, which is in communication with the conduit 31.

Of course, although a hydraulic braking system is described, it is understood that other means for simultaneously applying a braking force to all of the brake mechanisms may be utilized.

If we assume that the upper end 15 of the brake shoe 14 is pivoted to a rigidly positioned pivot, the application of the braking force by hydraulic pressure in cylinder 30 will cause both brake shoes 25 and 26 to be urged by the frictional drag into contact with the brake drum. It is assumed that for this purpose the wheel carrying the drum 13 rotates in the direction of arrow 34. It is also seen that although a comparatively minor braking force is applied to the end 24 of brake shoe 25, this force is considerably augmented along the inner periphery of the drum and may reach considerable proportions adjacent the anchor 15. In this type of "self-energizing" brake the ultimate braking force adjacent the anchor 15, which is remote from the brake applying end 24, depends upon the integration of the frictional forces along elemental angles of the braking element. Any slight irregularity or non-conformity in these surfaces is very apt to cause uneven braking effects, and this occurs in spite of the fact that the internal brake applying forces may be equal for each of the brakes in the system.

In order to reduce substantially the possibility of any such uneven braking effect, means are provided for insuring equality of braking forces for all of the brakes involved in the system at points remote from the points where the braking force is applied. Thus for example in Fig. 2, the anchor 15 is pivoted to a piston 19. This piston has a packing, such as a cup leather 22, and works within a cylinder 20 supported upon the member 21.

The space formed within the cylinder 20 is filled with a non-compressible fluid, such as light oil or the like, and each of the cylinder spaces 20 for all of the brakes in the system are joined by conduits. Thus conduit 26 is joined to the cylinder 20 by way of port 23. However, a limit is placed upon the inward travel of the piston 19, as by the aid of a concentric boss 35 surrounding port 23. In this way, should there be accidental loss of fluid from the cylinders 20, the brake will still be effective, although it may not be equalized.

When pressure is exerted at the free end 24 of the brake elements 14 in any manner to apply the elements, this pressure, together with the integrated frictional pressures, are transmitted by the elements and piston 19 to the liquid in cylinder 20. No movement of the braking elements toward the drum 13 will occur until piston 19 is stopped in its inward travel. When this occurs, the shoes 25 and 26 will expand outwardly and engage the inner surface of drum 13. As the cylinders 20 are all in communication by way of conduit 26, the forces expanding the braking elements in each brake will thus be equalized at a point 15 remote from the point of application of the brakes.

A tension spring 70 serves to return the shoes to their retracted position upon release of the force causing expansion of the braking element.

This arrangement is particularly useful in cases where the brake drums are slightly elliptical due to the heat generating in braking or other causes. Under such circumstances the pressures set up in a self-energizing brake may become very great and possibly sufficient to lock the wheel. The floating anchor 15 permits relieving of the brake pressure and to distribute this brake pressure to the other brakes.

To ensure that the system is at all times filled with liquid, a small supply tank 36 is placed in communication with it (Fig. 3). The tank has a hollow boss 37 at its lower end to which is connected conduit 26 and which is in communication with the interior of the tank through a port 38 controlled by a check valve 39. A piston 40 is slidable within the tank, being urged downwardly by a spring 41 confined between it and a closure cap 42 for the top of the tank. Piston 40 and spring 41 are effective to force liquid past check valve 39 into conduit 26 and the connected parts, the check being effective to prevent the pressure set up in the conduit by a brake application forcing liquid into the tank. Various liquids are suitable for this purpose, a light oil such as is used in hydraulic brakes being particularly suitable.

The equalization of braking effect may be obtained in a slightly different way. Thus in Fig. 4 is shown a brake similar to that shown in Fig. 2. In this form, however, the floating support for anchor 15 is omitted, the end of shoe member 26 being secured to member 21 by a pin 45. The link connecting the shoes includes an expansible member 46, which may be a cylinder 47 pivotally secured to one of the shoes, as 25, having a packed piston 48 slidable therein pivotally secured to the other shoe, as 26. Port 49 communicates with the interior of the cylinder and a conduit 50, corresponding to conduit 26 of the first form, places the cylinders of the several brakes in communication. In this form the members 46 serve to equalize directly the forces exerted by the shoes 25 of the different brakes upon their associated members 26, achieving the same results as in the first form. Stops 51 may be provided to limit the movement of the piston as before, in case of accidental loss of liquid.

As in the previously described arrangement, a tension spring 71 is effective to urge the shoes 25, 26 to their retracted position.

Figure 5 shows the arrangement as applied to an internal expanding brake of a different type. In this form the brake band 52 is formed of two similar shoes 53 and 54, pivotally supported at their upper ends by a stationary member 55 supported on the back plate. The band is expanded to engage the drum by a floating wedge 56, which is forced radially outward between rollers 57 pinned to the lower or unsupported ends of the shoes. The opposite end of shoe 54 is pivotally secured to member 55 by a pin 58. The corresponding end of shoe member 53 engages a piston 59, slidable within a cylinder 60 formed in support member 55. A port 61 communicates with the interior of cylinder 60, the ports of the various cylinders being connected as before by a conduit 26. It will be apparent that the cylinders and piston will serve to equalize the pressures exerted by the different brakes. A stop 62 is provided to limit the movement of the piston. As before, a tension spring 72 urges the shoes 53, 54 to their retracted position.

It will be understood that any of the usual adjusting means to provide for wear of the brake bands or other factors are to be used with any of the described forms.

What is claimed is:

1. In a braking system having a plurality of brake drums, an expansible braking element for each drum, each braking element including a pair of shoes, as well as means forming a pivotal connection between adjacent ends of the shoes, said connection being substantially entirely supported by the connected ends of the shoes, one of the shoes of each element being anchored at its end remote from said connection, means for simultaneously applying a force to the ends of each of the other shoes remote from said connection, the combination therewith of: fluid pressure responsive means in each of the connections and means connecting all of said fluid pressure means for substantially equalizing the forces acting through the connections due to brake applying force.

2. In a braking system having a plurality of brake drums, an expansible braking element for each drum, each braking element including a pair of shoes, as well as means forming a pivotal connection between adjacent ends of the shoes, said connection being such that the connected ends of the shoes are free to move toward the drum in response to brake applying force, one of the shoes of each element being anchored at its end remote from said connection, means for simultaneously applying a force to the ends of each of the other shoes remote from said connection, the combination therewith of: fluid pressure responsive means in each of the connections and means connecting all of said fluid pressure means for substantially equalizing the forces acting through the connections due to brake applying force.

3. In a braking system having a plurality of brake drums, an expansible braking element for each drum, each braking element including a pair of shoes, each of said shoes being of substantially equal angular extent and together extending substantially entirely around the drum, as well as means forming a pivotal connection between adjacent ends of the shoes, said connection being substantially entirely supported by the connected ends of the shoes, one of the shoes of each element being anchored at its end remote from said connection, means for simultaneously applying a force to the ends of each of the other shoes remote from said connection, the combination therewith of: fluid pressure responsive means in each of the connections and means connecting all of said fluid pressure means for substantially equalizing the forces acting through the connections due to brake applying force.

4. In a braking system having a plurality of brake drums, an expansible braking element for each drum, each braking element including a pair of shoes, as well as means forming a pivotal connection between adjacent ends of the shoes, said connection being substantially entirely supported by the connected ends of the shoes, one of the shoes of each element being anchored at its end remote from said connection, means for simultaneously applying a force to the ends of each of the other shoes remote from said connection, the combination therewith of: fluid pressure responsive means in each of the connections, means connecting all of said fluid pressure means for substantially equalizing the forces acting through the connections due to brake applying force, and means to ensure that the system is filled with liquid.

5. In a braking system having a plurality of brake drums, an expansible braking element for each drum, each braking element including a pair of shoes, as well as means forming a pivotal connection between adjacent ends of the shoes, said connection being substantially entirely supported by the connected ends of the shoes, means forming an anchor for each braking element, and means to apply a force simultaneously urging the ends of said shoes of each element remote from said connection relatively apart, said connection including means arranged to oppose the movement of the connected ends toward each other in response to said force, one of said means including pressure responsive means for substantially equalizing the forces acting through the connections due to said force.

6. In a braking system having a plurality of brake drums, an expansible braking element for each drum, each braking element including a pair of shoes, as well as means forming a pivotal connection between adjacent ends of the shoes, said connection being substantially entirely supported by the connected ends of the shoes, means forming an anchor for each braking element, and means to apply a force simultaneously urging the ends of said shoes of each element remote from said connection relatively apart, said connection including means arranged to oppose the movement of the connected ends toward each other in response to said force, one of said means including pressure responsive means for substantially equalizing the forces acting through the connections due to said force, said pressure responsive means having relatively movable parts with stop means to limit movement between the parts in response to the last mentioned force.

ALFRED REX HARVEY.